United States Patent
Kim et al.

(10) Patent No.: US 8,705,116 B2
(45) Date of Patent: Apr. 22, 2014

(54) IMAGE FORMING APPARATUS AND COLOR TABLE GENERATING METHOD AND COLOR DOCUMENT PRINTING METHOD THEREOF

(75) Inventors: Kyeong-man Kim, Yongin-si (KR); Hyun-soo Oh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 782 days.

(21) Appl. No.: 12/141,482

(22) Filed: Jun. 18, 2008

(65) Prior Publication Data

US 2009/0015852 A1 Jan. 15, 2009

(30) Foreign Application Priority Data

Jul. 13, 2007 (KR) .................. 10-2007-0070659

(51) Int. Cl.
*H04N 1/60* (2006.01)
*G03F 3/08* (2006.01)

(52) U.S. Cl.
USPC ............ 358/1.9; 358/518; 358/405; 358/406; 358/520; 358/500; 382/162; 382/167

(58) Field of Classification Search
USPC ............... 358/1.9, 518, 405, 406, 520, 500; 382/162, 167
See application file for complete search history.

(56) References Cited

U.S. PATENT DOCUMENTS

| | | | |
|---|---|---|---|
| 5,271,096 A * | 12/1993 | Cook | 345/604 |
| 6,014,457 A * | 1/2000 | Kubo et al. | 382/167 |
| 7,450,755 B2 | 11/2008 | Lee et al. | |
| 7,860,316 B2 | 12/2010 | Ohk | |
| 2004/0028421 A1 | 2/2004 | Shiratori | |
| 2004/0130739 A1 * | 7/2004 | Adam et al. | 358/1.9 |
| 2005/0169525 A1 | 8/2005 | Lee et al. | |
| 2006/0206812 A1 * | 9/2006 | Li et al. | 715/528 |
| 2007/0116359 A1 | 5/2007 | Ohk | |
| 2011/0064310 A1 | 3/2011 | Ohk | |

FOREIGN PATENT DOCUMENTS

| | | |
|---|---|---|
| CN | 1480796 | 3/2004 |
| CN | 1649385 | 8/2005 |
| EP | 1388764 A2 | 2/2004 |
| EP | 1388764 A3 | 3/2006 |
| EP | 1388764 B1 | 8/2008 |
| JP | 10-155095 | 6/1998 |
| JP | 2000-113185 | 4/2000 |
| JP | 2002-247396 | 8/2002 |

(Continued)

OTHER PUBLICATIONS

Chinese Office Action dated Apr. 18, 2012 from Chinese Patent Application No. 200810099259.0.

(Continued)

*Primary Examiner* — Quang N Vo (74) *Attorney, Agent, or Firm* — Staas & Halsey LLP (57) ABSTRACT

An image forming apparatus, and a color table generating method and color document printing method of the image forming apparatus. The image forming apparatus includes a color matching unit to match colors of a color document containing one or more images formed with a preset number of colors with colors available in the image forming apparatus, and a color table generator to generate a color table using the matched colors. Therefore, it is possible to reduce the color change caused by a difference in the characteristics between a printer and a scanner.

34 Claims, 4 Drawing Sheets

(56) References Cited

FOREIGN PATENT DOCUMENTS

| | | |
|---|---|---|
| JP | 2002-262120 | 9/2002 |
| JP | 2005-084932 | 3/2005 |
| KR | 2002-41697 | 6/2002 |
| KR | 10-0664311 | 12/2006 |

OTHER PUBLICATIONS

Korean Office Action dated May 15, 2012 from Korean Patent Application No. 10-2008-0019210.

Chinese Office Action dated Sep. 27, 2012, in Chinese Patent Application No. 200810099259.0.

* cited by examiner

IMAGE FORMING APPARATUS AND COLOR TABLE GENERATING METHOD AND COLOR DOCUMENT PRINTING METHOD THEREOF

CROSS-REFERENCE TO RELATED APPLICATIONS

This application claims the benefit of Korean Application No. 2007-70659, filed Jul. 13, 2007, in the Korean Intellectual Property Office, the disclosure of which is incorporated herein by reference.

BACKGROUND OF THE INVENTION

1. Field of the Invention

Aspects of the present invention relate to an image forming apparatus, and a color table generating method and color document printing method of the image forming apparatus. More particularly, aspects of the present invention relate to an image forming apparatus, and a color table generating method and color document printing method of the image forming apparatus that can reduce color change occurring when copying a color document, such as a map that is created using a preset number of colors.

2. Description of the Related Art

Conventional image forming apparatuses, such as printers or copiers, are single function devices. However, the recent development of digital technologies has brought multifunction peripherals (MFPs), which are single devices that can perform multiple functions as a printer, a scanner, a facsimile machine, or other devices.

MFPs include various types of communication modules so that data can be transmitted and received, in addition to the original functions of the respective image forming apparatuses, such as a printing function in printers or a scanning function in scanners.

If a document is copied using an MFP, the document may be scanned using a scanner, and printed using a printer, all using the same device.

If a color document is copied using a scanner and a printer, the printed document may not have the same colors as the original color document, because the characteristics of scanners and printers differ from each other.

During color copying, conventional MFPs match the characteristics of scanners and printers using color management functions of image processors or using three-dimensional (3D) processors, and then perform color processing using 3D tables.

However, even if the characteristics of scanners and printers are matched using color management functions or 3D processors, it is difficult for conventional MFPs to completely duplicate colors of the original color document.

SUMMARY OF THE INVENTION

Aspects of the present invention relate to an image forming apparatus, and a color table generating method and color document printing method of the image forming apparatus which use a color table generated by matching colors of a color document containing one or more images composed of a limited number of colors with colors available in the image forming apparatus, so that color change occurring when performing color copying can be reduced.

According to an embodiment of the present invention, there is provided an image forming apparatus including a color matching unit to match colors of a color document containing one or more images composed of a preset number of colors with colors available in the image forming apparatus; and a color table generator to generate a color table using the matched colors.

According to an aspect of the present invention, the color document may be a map or a receipt.

According to an aspect of the present invention, the colors of the color document may be preset according to how the one or more images of the color document are used, or may be measured using a color measuring device with respect to the one or more images of the color document.

According to an aspect of the present invention, the image forming apparatus may further include an index generator to receive the colors for each of the one or more images of the color document to generate an index of the received colors of the color document.

According to an aspect of the present invention, the color matching unit may convert the colors of the color document to colors in a Lab color space, and may again convert the converted colors in the Lab color space to colors in a CMYK color space. The color table generator may match the colors of the color document, the converted colors in the Lab color space and the converted colors in the CMYK color space to generate the color table.

According to an aspect of the present invention, the color matching unit may convert the colors of the color document to the colors in the CMYK color space, and the color table generator may match the colors of the color document and the converted colors in the CMYK color space to generate the color table.

According to another embodiment of the present invention, there is provided a method of generating a color table in an image forming apparatus, the method including matching colors of a color document containing one or more images composed of a preset number of colors with colors available in the image forming apparatus; and generating a color table using the matched colors.

According to an aspect of the present invention, the color document may be a map or a receipt.

According to an aspect of the present invention, the colors of the color document may be preset according to how one or more images of the color document are used, or may be measured using a color measuring device with respect to the one or more images of the color document.

According to an aspect of the present invention, the method may further include receiving the colors for each of the one or more images of the color document to generate an index of the received colors of the color document.

According to an aspect of the present invention, the matching may include converting the colors of the color document to colors in a Lab color space, and converting the converted colors in the Lab color space to colors in a CMYK color space. The generating may include matching the colors of the color document, the converted colors in the Lab color space and the converted colors in the CMYK color space to generate the color table.

According to an aspect of the present invention, the matching may include converting the colors of the color document to the colors in the CMYK color space, and the generating may include matching the colors of the color document and the converted colors in the CMYK color space to generate the color table.

According to another embodiment of the present invention, there is provided an image forming apparatus including a scanning unit to scan a color document containing one or more images composed of a preset number of colors; an original color extracting unit to extract colors for each of one or more images of the scanned color document; a compared color extracting unit to compare the extracted colors to a color table and to extract colors available in the image forming apparatus; and an output unit to print the scanned color document using the extracted colors, wherein the color table is generated by matching the colors of the color document created using the preset number of colors with the colors available in the image forming apparatus.

According to an aspect of the present invention, the color document may be a map or a receipt.

According to an aspect of the present invention, the image forming apparatus may further include a user interface unit to receive a copy command for the color document.

According to an aspect of the present invention, the compared color extracting unit may search for colors similar to the extracted colors from the color table, and may determine the searched colors to be output colors in the images if a result obtained by comparing the extracted colors to the searched colors using the following Equation 1 is equal to or less than a threshold value, $$f(k_i, s) = \sqrt{(L_s - L_i)^2 + (a_s - a_i)^2 + (b_s - b_i)^2} < TH \quad \text{[Equation 1]}$$

in Equation 1, $k_i$ is a color extracted from an $i^{th}$ image, and s is a color of the color table for the $i^{th}$ image. $L_s$, $a_s$ and $b_s$ are colors of the color table based on the Lab color space; $L_i$, $a_i$ and $b_i$ are colors extracted for each image based on the Lab color space; and TH is a threshold value.

According to another embodiment of the present invention, there is a method of printing a color document in an image forming apparatus, the method including scanning a color document containing one or more images composed of a preset number of colors; extracting colors for each of one or more images of the scanned color document; comparing the extracted colors to a color table and extracting colors available in the image forming apparatus; and printing the scanned color document using the extracted colors, wherein the color table is generated by matching the colors of the color document created using the preset number of colors with the colors available in the image forming apparatus.

According to an aspect of the present invention, the color document may be a map or a receipt.

According to an aspect of the present invention, the method may further include receiving a copy command for the color document.

According to an aspect of the present invention, the extracting may include searching for colors similar to the extracted colors from the color table; and determining the searched colors to be output colors in the images if a result obtained by comparing the extracted colors to the searched colors using the following Equation 1 is equal to or less than a threshold value, $$f(k_i, s) = \sqrt{(L_s - L_i)^2 + (a_s - a_i)^2 + (b_s - b_i)^2} < TH \quad \text{[Equation 1]}$$

in Equation 1, $k_i$ is a color extracted from an $i^{th}$ image, and s is a color of the color table for the $i^{th}$ image. $L_s$, $a_s$ and $b_s$ are colors of the color table based on the Lab color space; $L_i$, $a_i$ and $b_i$ are colors extracted for each image based on the Lab color space; and TH is a threshold value.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
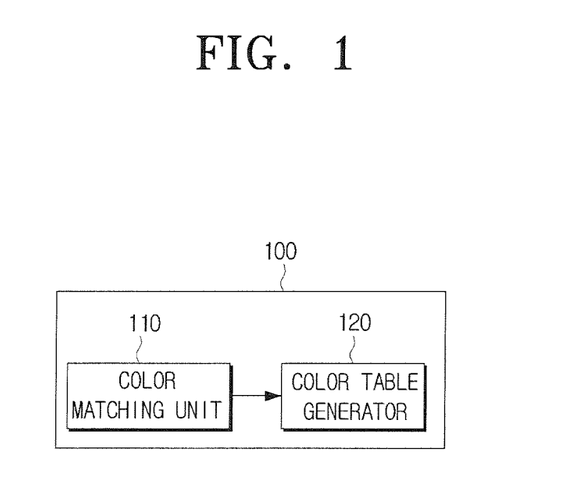
FIG. 1 is a block diagram of an image forming apparatus according to an embodiment of the present invention.

FIG. 1 is a block diagram of an image forming apparatus according to an embodiment of the present invention.

An image forming apparatus 100 of FIG. 1 includes a color matching unit 110 and a color table generator 120.

The color matching unit 110 matches colors of a color document with colors available in the image forming apparatus 100. Here, the number of colors used in the color document is limited to a preset number, so the color document may be generated using the limited number of colors. The color document may be a map, receipt or other document.

For example, maps use a wide, but limited range of colors. Government and public offices, buildings, railroads, territorial boundaries or the like may be displayed in black; sections of the map relating to residential areas, tourist resorts, sea routes or the like may be displayed in red; and sections relating to water, air routes or the like may be displayed in blue. Likewise, color documents such as receipts typically use a limited range of colors. Commonly used colors for each image have been already set on a map, and many colors may not be actually used.

The color table generator 120 generates a color table using the colors matched by the color matching unit 110. Specifically, the color table may be generated by the color table generator 120 by matching colors for each of one or more images of the color document with the colors available in the image forming apparatus 100.

Figure 2:
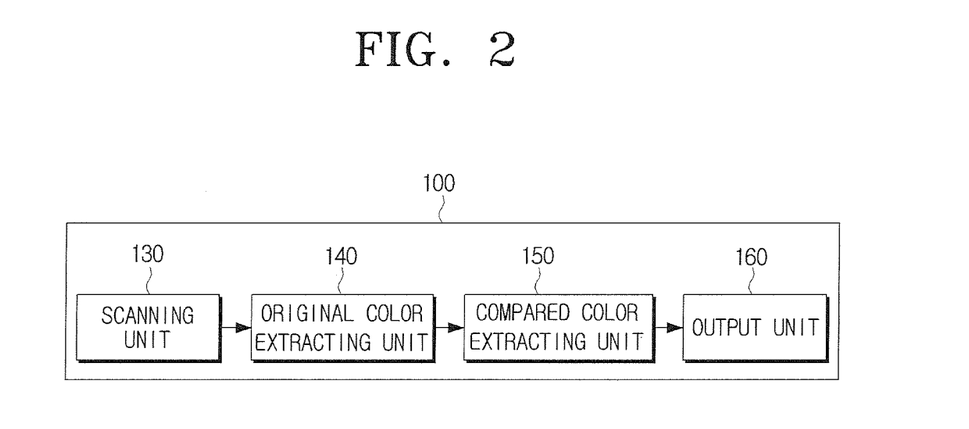
FIG. 2 is a block diagram of an image forming apparatus according to another embodiment of the present invention.

FIG. 2 is a block diagram of an image forming apparatus according to another embodiment of the present invention.

In FIG. 2, the image forming apparatus 100 includes a scanning unit 130, an original color extracting unit 140, a compared color extracting unit 150 and an output unit 160.

If a user inputs a copy command, the scanning unit 130 may scan a color document in the image forming apparatus 100. The scanning unit 130 may generate a scan image of the scanned color document.

The original color extracting unit 140 extracts colors for each of one or more images of the scanned color document using the scan image generated by the scanning unit 130.

The compared color extracting unit 150 compares the colors extracted by the original color extracting unit 140 with a previously generated color table, and extracts colors available in the image forming apparatus 100.

The output unit 160 prints the scan image generated by the scanning unit 130 using the colors available in the image forming apparatus 100, which are extracted by the compared color extracting unit 150. The colors of the prints printed by the output unit 160 may differ from the colors of the original document, but the prints have the colors most similar to the colors available in the image forming apparatus 100.

Figure 3:
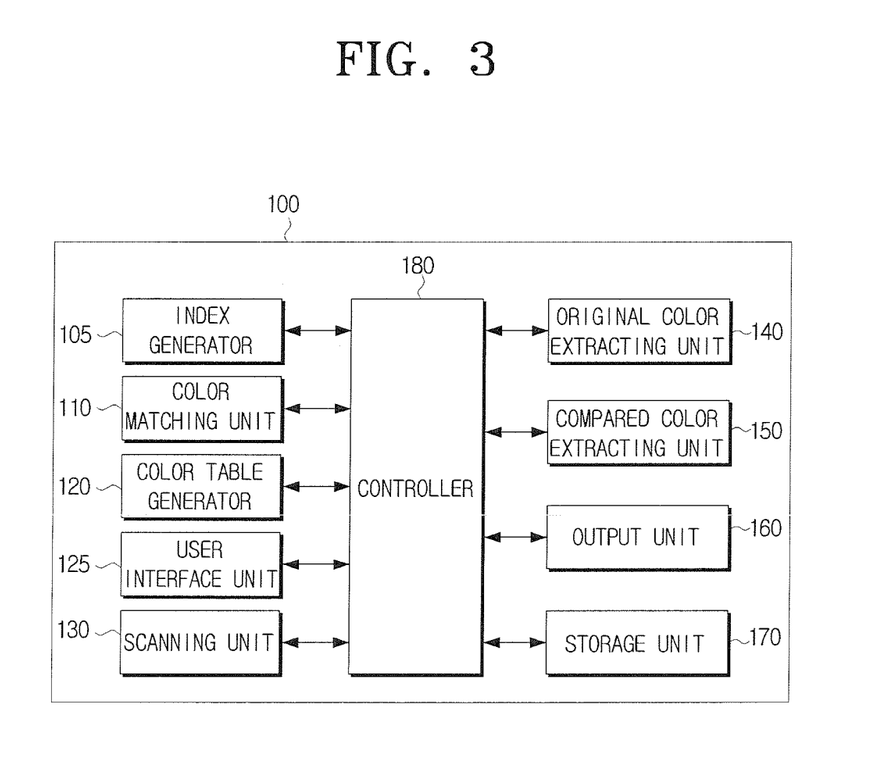
FIG. 3 is a block diagram of an image forming apparatus according to another embodiment of the present invention.

FIG. 3 is a block diagram of an image forming apparatus according to another embodiment of the present invention.

In FIG. 3, the image forming apparatus 100 includes an index generator 105, a color matching unit 110, a color table generator 120, a user interface unit 125, a scanning unit 130, an original color extracting unit 140, a compared color extracting unit 150, an output unit 160, a storage unit 170 and a controller 180.

The image forming apparatus 100 according to the third embodiment of the present invention includes all the units of the image forming apparatus 100 according to the first and second embodiments described above, and the same reference numerals denote the same units.

The index generator 105 receives colors for each of one or more images of a color document, and generates an index of the received colors of the color document. In this situation, the colors of the color document may be preset according to how the one or more images of the color document are used, and may have color values in an RGB color space. Alternatively, the colors of the color document may be measured using a color measuring device with respect to the one or more images of the color document, and may have color values in a Lab color space.

The color matching unit 110 matches the colors for each image of the color document with the colors available in the image forming apparatus 100, using the index generated by the index generator 105.

If the colors of the color document have color values in the RGB color space, the color matching unit 110 may convert each color value in the RGB color space to color values in the Lab color space, and may again convert the converted color values to color values in a CMYK color space. Alternatively, if the colors of the color document have color values in the Lab color space, the color matching unit 110 may directly convert each color value to color values in the CMYK color space.

The color table generator 120 generates a color table using the colors matched by the color matching unit 110. The color table generated by the color table generator 120 may comprise all the color values in the RGB, Lab and CMYK color spaces for each image of the color document.

The user interface unit 125 receives a copy command for the color document from a user. Although not shown in the drawings, the user may input the copy command using a copy key or other menu keys provided in the image forming apparatus 100.

The scanning unit 130 scans the color document. The color document scanned by the scanning unit 130 may be a document such as a map that uses a preset number of colors. The scanning unit 130 generates a scan image after scanning the color document.

The original color extracting unit 140 extracts colors for each of one or more images of the color document scanned by the scanning unit 130. Here, the scanned color document may be the scan image generated by the scanning unit 130.

The compared color extracting unit 150 compares the colors extracted by the original color extracting unit 140 to the color table generated by the color table generator 120, and extracts colors available in the image forming apparatus 100.

The compared color extracting unit 150 searches for colors similar to the extracted colors from the color table. If the result obtained by comparing the extracted colors to the searched colors using the following Equation 1 is equal to or less than a threshold value, the compared color extracting unit 150 may determine the searched colors to be colors output in the images.

$$f(k_i, s) = \sqrt{(L_s - L_i)^2 + (a_s - a_i)^2 + (b_s - b_i)^2} < TH \quad \text{[Equation 1]}$$

Figure 5:
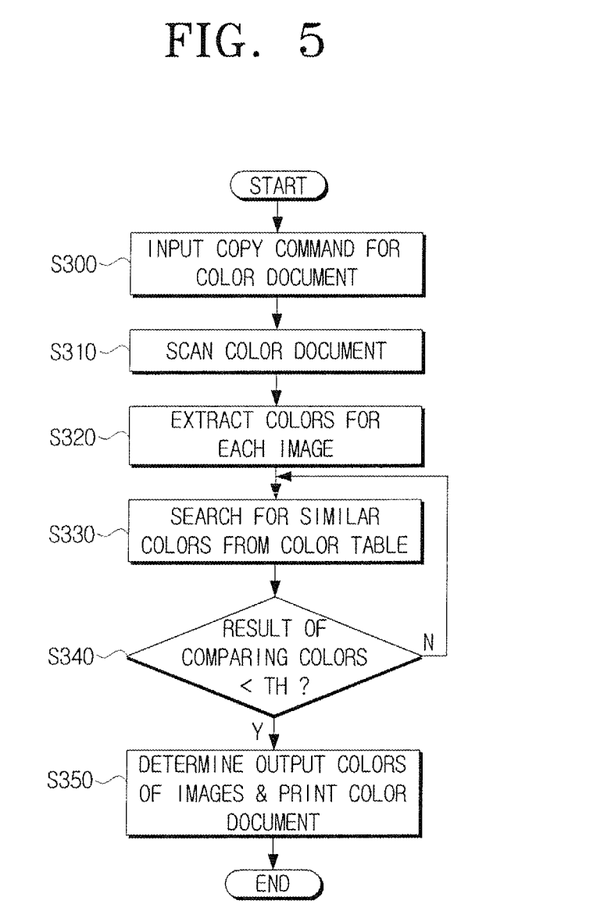
FIG. 5 is a flowchart explaining a method of printing a color document of an image forming apparatus according to another embodiment of the present invention.

In Equation 1, $k_i$ is a color extracted from an $i^{th}$ image, and s is a color of the color table for the $i^{th}$ image. $L_s$, $a_s$ and $b_s$ are colors of the color table based on the Lab color space; $L_i$, $a_i$ and $b_i$ are colors extracted for each image based on the Lab color space; and TH is a threshold value, which is selected in advance according to the desired degree of correlation between the extracted colors and the searched colors. More specifically, the threshold value may be determined using either of the following two methods. The first method is to set center values of colors of the color table generated by the color table generator, divide the CIE Lab color space into a plurality of segments and measure the distance between the center of each color and each respective segment. The second method is to determine a threshold value used when the compared color extracting unit 150 determines the searched colors to be colors output in the images. Referring to FIG. 5, the input color is repeatedly compared with the colors of the color table generated by the color table generator in order to decide a threshold value which yields a minimum error value therebetween. In more detail, while the colors of the color table are sequentially compared with the input color using Equation 1, the threshold value continues to be updated so that mapping is performed when the minimum error value is achieved. If another color is input, the threshold value is reset to an error value between the first color and the input color.

The output unit 160 outputs the scanned color document using the colors extracted for each image by the compared color extracting unit 150.

The storage unit 170 may store the index generated by the index generator 105, or may store the color table generated by the color table generator 120. Accordingly, the index stored in the storage unit 170 may be used by the color matching unit 110, and the color table stored in the storage unit 170 may be used by the compared color extracting unit 150.

The controller 180 controls the entire operation of the image forming apparatus 100. In more detail, the controller 180 controls signal input and output between the index generator 105, color matching unit 110, color table generator 120, user interface unit 125, scanning unit 130, original color extracting unit 140, compared color extracting unit 150, output unit 160 and storage unit 170.

The controller 180 reads the color table from the storage unit 170 and provides the compared color extracting unit 150 with the read color table, so that the compared color extracting unit 150 may search for colors similar to the colors extracted by the original color extracting unit 140 from the prestored color table.

Figure 4:
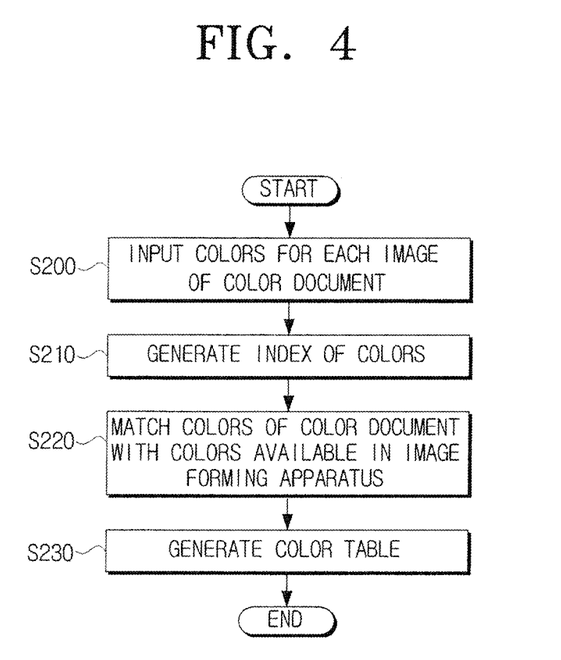
FIG. 4 is a flowchart explaining a method of constructing a color table in an image forming apparatus according to another embodiment of the present invention.

FIG. 4 is a flowchart showing a method of constructing a color table in an image forming apparatus according to another embodiment of the present invention.

A process of constructing a color table in the image forming apparatus 100 will be described with reference to FIGS. 3 and 4.

In operation S200, the colors for each image of the color document are received. In this situation, the colors for each image of the color document may be preset according to how the images of the color document are used, or may be measured using the color measuring device.

An index of the received colors is generated by the index generator 105 in operation S210. The index generated by the index generator 105 may be stored in the storage unit 170.

In operation S220, the color matching unit 110 matches the colors for the images of the color document with the colors available in the image forming apparatus 100, using the index generated by the index generator 105 or using the index stored in the storage unit 170.

In operation S230, the color table generator 120 generates a color table using the colors matched with the colors available in the image forming apparatus 100 by the color matching unit 110. In this situation, a color table may be generated in which the colors in at least one of the RGB and Lab color spaces are matched with the colors available in the image forming apparatus 100 in the CMYK color space. The color table generated by the color table generator 120 may be stored in the storage unit 170.

FIG. 5 is a flowchart showing a method of printing a color document of an image forming apparatus according to another embodiment of the present invention.

A process of printing a color document using the preset number of colors in the image forming apparatus 100 of the present invention will be described with reference to FIGS. 3 and 5. In this embodiment, the color table has been stored in the image forming apparatus 100 through the operations described in FIG. 4.

A user inserts a color document which he desires to copy into the image forming apparatus 100, and, in operation S300, inputs the copy command. Accordingly, the copy command may be input by the user through the user interface unit 125.

If the copy command is input, the scanning unit 130 may scan the color document in the image forming apparatus 100 in operation S310.

After the color document is scanned by the scanning unit 130, the original color extracting unit 140 may extract colors for each image of the scanned color document in operation S320.

In operation S330, the compared color extracting unit 150 then searches for colors similar to the colors extracted by the original color extracting unit 140 from the color table stored in the storage unit 170.

After searching for colors similar to the extracted colors, the compared color extracting unit 150 compares the searched colors to the extracted colors using Equation 1. If the result obtained by comparing the extracted colors to the searched colors using Equation 1 is equal to or less than the threshold value in operation S340-Y, the compared color extracting unit 150 may determine the searched colors to be output colors in the images in operation S350.

Alternatively, if the result is greater than the threshold value in operation S340-N, the compared color extracting unit 150 may return to operation S330 to search for the similar colors again.

As described above, in the image forming apparatus, color table generating method and color document printing method of the image forming apparatus according to the embodiments of the present invention, a color table in which the colors of the color document containing one or more images composed of the preset number of colors are matched with the colors available in the image forming apparatus is used in copying the color document. Thereby, it is possible to reduce the color change caused by differences in the characteristics between a printer and a scanner when color documents such as maps or receipts are copied in color.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus comprising:
a color matching unit to match colors of a color document containing one or more images comprising a preset number of colors with colors available in the image forming apparatus;
a color table generator to generate a color table using the matched colors;
a compared color extracting unit to compare colors extracted from a scanned color document with colors in the color table, and to determine output colors in the images when a correlation between the extracted colors from the scanned color document and colors in the color table is equal to or less than a predetermined threshold; and
an output unit to print the color document using the determined output colors available in the image forming apparatus,
wherein the preset number of colors of the color document are determined according to whether the color document corresponds to a predetermined document type.

2. The image forming apparatus of claim 1, wherein the predetermined document type includes a map or a receipt.

3. The image forming apparatus of claim 1, wherein the preset number of colors of the color document are further determined according to whether the one or more images of the color document correspond to one or more predetermined images of the predetermined document type.

4. The image forming apparatus of claim 1, wherein the colors of the color document are measured using a color measuring device with respect to the one or more images of the color document.

5. The image forming apparatus of claim 3, further comprising:
an index generator to receive the colors for each of the one or more images of the color document to generate an index of the received colors of the color document.

6. The image forming apparatus of claim 3, wherein the color matching unit converts the colors of the color document to colors in a Lab color space and then converts the converted colors in the Lab color space to colors in a CMYK color space, and
the color table generator matches the colors of the color document, the converted colors in the Lab color space and the converted colors in the CMYK color space to generate the color table.

7. The image forming apparatus of claim 4, wherein:
the color matching unit converts the colors of the color document to the colors in the CMYK color space, and
the color table generator matches the colors of the color document and the converted colors in the CMYK color space to generate the color table.

8. A method of generating a color table used in printing a color document in an image forming apparatus, the method comprising:
matching colors of the color document containing one or more images comprising a preset number of colors with colors available in the image forming apparatus; and
generating a color table using the matched colors;
comparing colors extracted from a scanned color document with colors in the color table, and determining output colors in the images when a correlation between the extracted colors from the scanned color document and colors in the color table is equal to or less than a predetermined threshold; and printing the color document using the determined output colors available in the image forming apparatus, wherein the preset number of colors of the color document are determined according to whether the color document corresponds to a predetermined document type.

9. The method of claim 8, wherein the predetermined document type includes a map or a receipt.

10. The method of claim 8, wherein the preset number of colors of the color document are further determined according to whether the one or more images of the color document correspond to one or more predetermined images of the predetermined document type.

11. The method of claim 8, wherein the colors of the color document are measured using a color measuring device with respect to the one or more images of the color document.

12. The method of claim 10, further comprising:

receiving the colors for each of the one or more images of the color document to generate an index of the received colors of the color document.

13. The method of claim 10, wherein:

the matching comprises converting the colors of the color document to colors in a Lab color space, and converting the converted colors in the Lab color space to colors in a CMYK color space; and the generating the color table comprises matching the colors of the color document, the converted colors in the Lab color space and the converted colors in the CMYK color space to generate the color table.

14. The method of claim 11, wherein:

the matching comprises converting the colors of the color document to the colors in the CMYK color space; and the generating the color table comprises matching the colors of the color document and the converted colors in the CMYK color space to generate the color table.

15. An image forming apparatus comprising:

a scanning unit to scan a color document containing one or more images comprising a preset number of colors;

an original color extracting unit to extract colors for each of the one or more images of the scanned color document;

a compared color extracting unit to compare the colors extracted from the scanned document with colors in a color table, and to determine output colors in the images when a correlation between the extracted colors from the scanned color document and colors in the color table is equal to or less than a predetermined threshold; and an output unit to print the scanned color document using the determined output colors, wherein the color table is generated by matching the colors of the color document with colors available in the image forming apparatus, and wherein the preset number of colors of the color document are determined according to whether the color document corresponds to a predetermined document type.

16. The image forming apparatus of claim 15, wherein the predetermined document type includes a map or a receipt.

17. The image forming apparatus of claim 15, further comprising:

a user interface unit to receive a copy command for the color document.

18. The image forming apparatus of claim 15, wherein the compared color extracting unit determines the output colors using the following Equation 1, $$f(k_i,s) = \sqrt{(L_s-L_i)^2+(a_s-a_i)^2+(b_s-b_i)^2} < TH \quad \text{[Equation 1]}$$

wherein, in Equation 1, $k_i$ is a color extracted from an $i^{th}$ image, and s is a color of the color table for the $i^{th}$ image; $L_s$, $a_s$ and $b_s$ are colors of the color table based on the Lab color space; $L_i$, $a_i$ and $b_i$ are colors extracted for each image based on the Lab color space; and TH is a threshold value.

19. A method of printing a color document in an image forming apparatus, the method comprising:

scanning a color document containing one or more images comprising a preset number of colors;

extracting colors for each of the one or more images of the scanned color document;

comparing the colors extracted from the scanned color document with colors in a color table and determining output colors in the images when a correlation between the extracted colors from the scanned color document and colors in the color table is equal to or less than a predetermined threshold; and printing the scanned color document using the determined output colors, wherein the color table is generated by matching the colors of the color document with colors available in the image forming apparatus, wherein the preset number of colors of the color document are determined according to whether the color document corresponds to a predetermined document type.

20. The method of claim 19, wherein the preset number of colors of the color document used to generate the color table are further preset according to whether the one or more images of the color document correspond to one or more predetermined images of the predetermined document type.

21. The method of claim 20, wherein:

the matching of the colors of the color document with the colors available in the image forming apparatus comprises converting the colors of the color document to colors in a Lab color space, and converting the converted colors in the Lab color space to colors in a CMYK color space; and matching the colors of the color document, the converted colors in the Lab color space and the converted colors in the CMYK color space to generate the color table.

22. The method of claim 19, wherein the colors of the color document used to generate the color table are measured using a color measuring device with respect to the one or more images of the color document.

23. The method of claim 22, wherein:

the matching of the colors of the color document with the colors available in the image forming apparatus comprises converting the colors of the color document to the colors in the CMYK color space; and matching the colors of the color document and the converted colors in the CMYK color space to generate the color table.

24. The method of claim 19, wherein the predetermined document type includes a map or a receipt.

25. The method of claim 19, further comprising: receiving a copy command for the color document.

26. The method of claim 19, wherein the determining the output colors is performed using the following Equation 1, $$f(k_i,s) = \sqrt{(L_s-L_i)^2+(a_s-a_i)^2+(b_s-b_i)^2} < TH \quad \text{[Equation 1]}$$

wherein, in Equation 1, $k_i$ is a color extracted from an $i^{th}$ image, and s is a color of the color table for the $i^{th}$ image; $L_s$, $a_s$ and $b_s$ are colors of the color table based on the Lab color space; $L_i$, $a_i$ and $b_i$ are colors extracted for each image based on the Lab color space; and TH is the threshold value.

27. The method of claim 19, further comprising:
generating an index of colors of the color document; and storing the index in a storage unit.

28. An image forming apparatus comprising:
an index generator to receive colors for each of one or more images of a color document containing one or more images comprising a preset number of colors, to generate an index of the received colors of the color document;
a color matching unit to match colors for each of one or more images of the color document according to the index generated by the index generator with colors available in the image forming apparatus;
a color table generator to generate a color table using the colors matched by the color matching unit;
a user interface unit to receive a copy command for the color document;
a scanning unit to scan the color document and to generate a scan image;
an original color extracting unit to extract colors from the scan image;
a compared color extracting unit to compare the colors extracted from the scanned image with colors in the color table generated by the color table generator and to determine output colors in the images when a correlation between the extracted colors from the scanned image and colors in the color table is equal to or less than a predetermined threshold;
an output unit to print the scanned color document using the determined output colors;
a storage unit to store the index generated by the index generator and/or to store the color table generated by the color table generator; and
a controller to control signal input and output between the index generator, color matching unit, color table generator, user interface unit, scanning unit, original color extracting unit, compared color extracting unit, output unit and storage unit,
wherein the number of colors of the color document received by the index generator are preset according to whether the color document corresponds to a predetermined document type.

29. The image forming apparatus of claim 28, wherein the predetermined document type includes a map or a receipt.

30. The image forming apparatus of claim 28, wherein the number colors of the color document received by the index generator are further preset according to whether the one or more images of the color document corresponds to one or more predetermined images of the predetermined document type, and the colors have values in an RGB color space.

31. The image forming apparatus of claim 30, wherein:
the color matching unit converts the preset colors of the color document in the RGB color space to colors in a Lab color space and then converts the converted colors in the Lab color space to colors in a CMYK color space, and
the color table generator matches the preset colors of the color document, the converted colors in the Lab color space and the converted colors in the CMYK color space to generate the color table.

32. The image forming apparatus of claim 28, wherein the colors of the color document are measured using a color measuring device with respect to the one or more images of the color document and have values in a Lab color space.

33. The image forming apparatus of claim 32, wherein:
the color matching unit converts the measured colors of the color document to the colors in the CMYK color space, and
the color table generator matches the measured colors of the color document and the converted colors in the CMYK color space to generate the color table.

34. The image forming apparatus of claim 28, wherein the compared color extracting unit determines the output colors using the following Equation 1, $$f(k_i,s) = \sqrt{(L_s-L_i)^2 + (a_s-a_i)^2 + (b_s-b_i)^2} < TH \qquad \text{[Equation 1]}$$

wherein, in Equation 1, ki is a color extracted from an ith image, and s is a color of the color table for the ith image; Ls, as and bs are colors of the color table based on the Lab color space; Li, ai and bi are colors extracted for each image based on the Lab color space; and TH is a threshold value.

* * * * *

UNITED STATES PATENT AND TRADEMARK OFFICE
CERTIFICATE OF CORRECTION

Page 1 of 1

PATENT NO.      : 8,705,116 B2
APPLICATION NO. : 12/141482
DATED           : April 22, 2014
INVENTOR(S)     : Kyeong-man Kim et al.

It is certified that error appears in the above-identified patent and that said Letters Patent is hereby corrected as shown below:

In the Claims

Column 12, Line 34, In Claim 34, delete "ki" and insert -- $k_i$ --, therefor.

Column 12, Line 34, In Claim 34, delete "ith" and insert -- $i^{th}$ --, therefor.

Column 12, Line 35, In Claim 34, delete "ith" and insert -- $i^{th}$ --, therefor.

Column 12, Line 36, In Claim 34, delete "Ls, as and bs" and insert -- $L_s$, $a_s$ and $b_s$ --, therefor.

Column 12, Line 37, In Claim 34, delete "Li, ai and bi" and insert -- $L_i$, $a_i$ and $b_i$ --, therefor.

Signed and Sealed this
Twenty-third Day of December, 2014

Michelle K. Lee
*Deputy Director of the United States Patent and Trademark Office*